United States Patent
Yanagisawa et al.

(10) Patent No.: US 8,728,620 B2
(45) Date of Patent: May 20, 2014

(54) FINE PARTICLES AND METHOD OF PRODUCING THEREOF, FINE PARTICLE DISPERSION LIQUID, AND IMAGE DISPLAY MEDIUM AND IMAGE DISPLAY APPARATUS

(75) Inventors: Masahiro Yanagisawa, Okayama (JP); Seigou Kawaguchi, Yonezawa (JP)

(73) Assignee: Ricoh Company, Ltd., Tokyo (JP)

(*) Notice: Subject to any disclaimer, the term of this patent is extended or adjusted under 35 U.S.C. 154(b) by 21 days.

(21) Appl. No.: 13/167,409

(22) Filed: Jun. 23, 2011

(65) Prior Publication Data

US 2011/0257354 A1  Oct. 20, 2011

Related U.S. Application Data (62) Division of application No. 11/661,352, filed as application No. PCT/JP2005/016171 on Aug. 30, 2005, now abandoned.

(30) Foreign Application Priority Data

Aug. 31, 2004 (JP) .................. 2004-252878

(51) Int. Cl.
*C08F 2/00* (2006.01)
*C08F 18/02* (2006.01)
*C08F 18/04* (2006.01)
*C08F 232/06* (2006.01)
*C08F 212/32* (2006.01)
*C08F 283/12* (2006.01)
*C08F 218/02* (2006.01)

(52) U.S. Cl.
CPC ............... *C08F 2/00* (2013.01); *C08F 212/32* (2013.01); *C08F 283/128* (2013.01); *C08F 218/02* (2013.01)
USPC ........... 428/402; 526/319; 526/328; 526/340; 526/346; 428/407; 428/447

(58) Field of Classification Search
USPC .......... 428/402, 407, 447; 526/319, 328, 340, 526/346
See application file for complete search history.

(56) References Cited

U.S. PATENT DOCUMENTS 4,460,732 A   7/1984   Buscall et al.
5,204,438 A * 4/1993   Snow et al. .............. 528/25
(Continued)

FOREIGN PATENT DOCUMENTS

EP   1 254 930 A2   11/2002
JP   48 31097       4/1973
(Continued)

OTHER PUBLICATIONS

Seigo et al., Preparation of Poly (2-vinylnaphthalene) Particles with High Refractive Index in Silicone Oil and Application to Electronic Rewritable Paper, Japanese Journal of Polymer Science and Technology, vol. 64, No. 1, pp. 62-73, 2007.

(Continued)

*Primary Examiner* — Hoa (Holly) Le
(74) *Attorney, Agent, or Firm* — Oblon, Spivak, McClelland, Maier & Neustadt, L.L.P.

(57) ABSTRACT

An object of the present invention is to provide white colored fine particles with high white reflectance and not easily precipitating in a dispersion medium compared to inorganic white pigments, a method of producing the fine particles, an image display medium and an image display apparatus having a high whiteness like a paper and an excellent display memorability using the fine particles. Therefore, the fine particles contain a polymer of a compound expressed by the following formula (1):

Structural Formula (1)

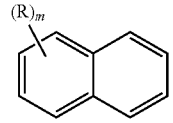

wherein, R represents a hydrogen atom, a halogen atom, an alkyl group or an alkenyl group, "m" represents an integer of 1 to 10, and at least one of R represents the alkenyl group.

4 Claims, 2 Drawing Sheets

(56) References Cited

U.S. PATENT DOCUMENTS

| | | |
|---|---|---|
| 5,250,382 A | 10/1993 | Shimojo et al. |
| 5,558,803 A | 9/1996 | Okada et al. |
| 6,096,235 A | 8/2000 | Asako et al. |
| 6,355,392 B1 | 3/2002 | Yoon |
| 6,451,941 B1 | 9/2002 | Urashima et al. |
| 6,897,002 B2 * | 5/2005 | Teraoka et al. ............... 430/114 |
| 7,195,852 B2 | 3/2007 | Moudry et al. |
| 7,354,961 B2 | 4/2008 | Azuma et al. |
| 2003/0071379 A1 | 4/2003 | Hayashi et al. |
| 2005/0009977 A1 * | 1/2005 | Azuma et al. ................. 524/457 |
| 2008/0193769 A1 * | 8/2008 | Yanagisawa et al. ...... 428/411.1 |

FOREIGN PATENT DOCUMENTS

| | | |
|---|---|---|
| JP | 57 145107 | 9/1982 |
| JP | 62 277415 | 12/1987 |
| JP | 05 173194 | 7/1993 |
| JP | 2612472 | 2/1997 |
| JP | 2000 063225 | 2/2000 |
| JP | 2003 117434 | 4/2003 |
| JP | 2003 121885 | 4/2003 |
| JP | 2003 270677 | 9/2003 |
| WO | WO 01/90226 A1 | 11/2001 |

OTHER PUBLICATIONS

Moacanin et al., Compatibility and Plasticization of Poly-B-Vinylnaphthalene with Polyethylene Oxide, Jet Propulsion Laboratory, Cal Tech, pp. 159-171, 1964.

* cited by examiner

FINE PARTICLES AND METHOD OF PRODUCING THEREOF, FINE PARTICLE DISPERSION LIQUID, AND IMAGE DISPLAY MEDIUM AND IMAGE DISPLAY APPARATUS

CROSS REFERENCE TO RELATED APPLICATIONS

This application is a divisional of U.S. patent application Ser. No. 11/661,352, filed Sep. 14, 2007 which is the U.S. national stage of International Application No. PCT/JP2005/016171, filed Aug. 30, 2005, the disclosures of which are incorporated herein by reference in their entireties. This application claims priority to Japanese Patent Application JP2004-252878, filed Aug. 31, 2004, the disclosures of which are incorporated herein by reference in their entireties.

TECHNICAL FIELD

The present invention relates to fine particles that can be applied to electrophoretic particles for an image display medium and a method of producing thereof, a fine particle dispersion liquid, and an image display medium and an image display apparatus.

BACKGROUND ART

Conventionally, CRTs and liquid crystal displays have been used as display terminals for images such as characters, static images, and moving images. These apparatuses can instantaneously display digital data and rewrite the data. However, these apparatuses have various drawbacks. For example, it is a hard work to always carry such apparatuses. In addition, seeing such a display apparatus for a long period time causes eye fatigue. Further, when power of such display apparatus is turned off, the images are not displayed.

When the characters or static images are distributed or stored as a literature, they are typically recorded by a printer on a paper medium. This paper medium has been used widely as a so-called hard copy. This hard copy is easier to read than those in display apparatuses, the degree of eye fatigue is much less and it can be read by free posture.

Further, hard copies have a characteristic which can be freely carried because of lightweight. However, hardcopies have a problem in view of material saving such that it requires much labor and costs when disposed and recycled after they are used.

Therefore, a need for a paper-like rewritable display medium has been increased which can have both advantages of display apparatuses and hard copies. Until now, display media using a liquid crystal dispersed in a polymer, a bistable cholesteric liquid crystal, an electrochromic element and an electrophoretic element, etc. have been proposed, which are a reflection type and can display high contrast images in addition to memorablility as a display medium.

Among them, apparatuses using an electrophoretic element have good display qualities and low power consumption while display operation (See Patent literatures 1 and 2). In such electrophoretic display medium, a dispersion liquid dispersed a plurality of electrophoretic particles having a color in which color is different from a color of a dispersion medium of the colored dispersion medium is filled between a pair of transparent electrodes. The electrophoretic particles (hereinafter, may be called "migration particle") have electric charge on a surface of the dispersion medium.

When a voltage having a polarity opposite to the charge of the electrophoretic particles is applied to one of the transparent electrodes, a color of the particles is observed by deposition of the particles on the transparent electrodes. To the contrary, when a voltage having the same polarity as the charge of the electropheretic particles is applied, the particles move toward the transparent electrode of the opposite side, so that the color of the dispersing medium is observed, thereby the images can be displayed.

Therefore, for the electrophoretic particles are required to have an optical property such as white or colored with respect to display state or non-display state, and a good electrostatic property for quick response to move to an outside electric field. Among the particles which have a white color showing a whiteness such as a paper, an inorganic pigment such as a titanium oxide which has a high light-scattering ability has been used conventionally. These inorganic pigments have been used as they are or by adding an additive such as a particle dispersing agent to improve dispersion stability. However, these pigments are usually not complete insulators and a volume resistivity is smaller than the insulator. Thus, in the outside electric filed region in the electrophoretic display, a good migration is difficult along in a direction of the electric field. Particularly, stability for repeatedly switching the display is inferior. Further, there is a problem of display memory in that the display state is changing with time because a specific gravity is remarkably big compared to the dispersion medium, precipitation cannot be prevented. While, in view of insulation and specific gravity as for charging particles, various types of polymer particles are preferable. Many of them migrate very well with respect to the outside electric field. However, among conventional polymer particles, white colored particles having a satisfactory optical property as display materials were not seen.

To satisfy the above two demands, Patent literature 3 has proposed to use a pigment and a polymer being complexed by heat fusion and finely-grinding. However, in this case, a specific gravity between the particle and the dispersion medium are not coincident completely and further there is a limitation in finely-grinding by grinding. The larger the particle diameter, the slower the migration speed is in the electrophoretic display medium, thereby there is a problem in display switching speed. Further, the pigment is not completely contained in the polymer, it may exist on the surface in a certain degree. Therefore, there occurs non-uniformity in charging the particles.

The above problem is not fully resolved at the present stage.

Patent Literature 1: Japanese Patent Application Laid-Open (JP-A) No. 05-173194
Patent Literature 2: Japanese Patent (JP-B) No. 2612472
Patent Literature 3: Japanese Patent Application Laid-Open (JP-A) No. 48-31097

DISCLOSURE OF INVENTION

It is an object of the present invention to provide white colored fine particles with high white reflectance and non-precipitation in the dispersion medium compared to inorganic white pigments and a method of producing the fine particles, an image display medium and an image display apparatus with high whiteness like a paper and excellent in display memorability using the above fine particles.

After the investigation by the present inventor for solving the above problems, it has been found that the white particle in the dispersion medium shows whiteness is that because light is diffused by a difference of a refractive index between the dispersion medium and the particle. The degree is correlation to the difference of the refractive index between the both. When the difference of the refractive index between the dispersion medium and the particle is larger, the white reflection becomes higher to look like a paper. Conventionally, a titanium oxide has a large refractive index and has been used as a white electrophertic particle accordingly. On the other hand, even a polystylene which has a high refractive index among polymer particles has a refractive index of 1.58. Thus, it was not possible to realize a sufficient light scattering.

Therefore, after investigated the above problems, the present invention has been made to solve the above problems by using fine particles containing a compound having a naphthalene skeleton which has a high refractive index as a white electrophoretic particle, thereby improving a strength of the light scattering more than ever. For example, 2-vinyl naphthalene has a refractive index of 1.69 which is extremely large among organic materials. Its polymer, a polyvinyl naphthalene also has a high refractive index and the scattering becomes stronger. As a result, the white refractive index which was not made possible when the titanium oxide was not used, can be attained with an organic material. In addition, in view of an electric property, charging is good due to good insulation. Moreover, as an electrophoretic particle, its migration is good. Since its specific gravity is small thereby not easily to precipitate, and dispersion stability is good. When it is used as an image display element, it is found it can be contribute to improve display memorability.

The present invention is based on the above findings by the present inventor and means to solve the above problems are as follows.

The fine particles of the present invention comprise a polymer of a compound expressed by the following formula (1).

Structural Formula (1)

In the above formula (1), R represents a hydrogen atom, a halogen atom, an alkyl group or an alkenyl group and "m" represents an integer of 1 to 10 and at least one of R represents the alkenyl group.

According to the fine particles of the present invention, by including at least the polymer of the compound expressed in the above formula (1), the fine particles having a high refractive index and a strong scattering can be obtained.

In the fine particles of the present invention, the compound expressed in the above formula (1) is preferably an aspect of a compound expressed either by the following formula (3) or (4).

Structural Formula (3)

Structural Formula (4)

In the above formulas (3) and (4), a naphthalene ring may be substituted by at least one of an alkyl group having carbon number of 1 to 12 and a halogen atom.

Preferably, the fine particles of the present invention include an aspect including a macromer, an aspect that the macromer is a silicone macromer expressed by the following formula (2), and an aspect that the fine particles are eletrophoretic particles for an image display medium. As a result, according to the present invention, the fine particles can be obtained, which disperse stably in a non-polar organic solvent, the particle diameter is small and scattering strength is high.

Structural Formula (2)

In the above formula (2), $R_1$ represents a hydrogen atom or a methyl group. $R_1'$ represents a hydrogen atom or an alkyl group having carbon number of 1 to 4, "n" represents natural number and "x" represents an integer of 1 to 3.

A method of producing the fine particles of the present invention includes forming fine particles by polymerizing the compound expressed either by the following formulas (3) and (4). According to the method of producing the fine particles of the present invention, the fine particles with less non-uniformity in a particle diameter and high scattering strength can be effectively obtained.

Structural Formula (3)

Structural Formula (4)

In the above formulas (3) and (4), a naphthalene ring may be substituted by at least one of an alkyl group having carbon number of 1 to 12 and a halogen atom.

According to the method of producing the fine particles of the present invention, polymerization is conducted in a solvent in which a compound expressed by a formula is soluble. Preferable aspects are that an aspect of depositing particles of insoluble polymer in the solvent, an aspect in which the solvent is non-polar organic solvent, an aspect of adding the macromer, and an aspect in which the macromer is a silicone macromer expressed by the following formula (2).

Structural Formula (2)

In the above formula (2), $R_1$ represents a hydrogen atom or a methyl group. $R_1'$ represents a hydrogen atom or an alkyl group having carbon number of 1 to 4. "n" represents a natural number and "x" represents an integer of 1 to 3.

The fine particle dispersion liquid of the present invention is made that the fine particles of the present invention are dispersed in a non-polar organic solvent. According to the fine particle dispersion liquid of the present invention, excellent effects that light scattering strength of the particles is high and dispersion stability in the non-polar organic solvent is also high, thereby a preferable particle dispersion liquid for electrophoretic display can be obtained.

In the fine particle dispersion liquid of the present invention, there are aspects that include a charge control agent, and a non-polar organic solvent is dissolved a dye having a different color from the fine particles and is colored.

The image display medium of the present invention comprises a pair of electrodes and the fine particle dispersion liquid of the present invention therebetween. According to the image display medium of the present invention, image display with high white reflection and excellent display memorability can be made because the fine particle dispersion liquid of the present invention is obtained.

In the image display medium of the present invention, preferable aspects include that the fine particles are electrophoretic by applying voltage between the pair of the electrode substrates so as to perform display operation, and the fine particle dispersion liquid is contained in a microcapsule, etc.

The image display apparatus of the present invention comprises the above image display medium of the present invention as a display means.

BEST MODE FOR CARRYING OUT THE INVENTION (Fine Particles)

The fine particles of the present invention comprise a polymer of the compound expressed by the following formula (1), and include a macromer and further other components, as needed.

In such fine particles may include a small amount of a compound (a monomer) expressed by the following formula (1), other than a polymer of a compound expressed by the following formula (1).

Structural Formula (1)

In the formula (1), R represents a hydrogen atom, a halogen atom, an alkyl group or an alkenyl group and "m" is an integer of 1 to 10. At least one of R represents the alkenyl group.

As to the halogen atom, for example, a fluorine atom, a chlorine atom, an iodine atom are included.

The alkyl group is preferable to have a carbon number of 1 to 12 and is more preferable to have a carbon number of 1 to 4. For example, a methyl group, an ethyl group, a propyl group and a butyl group are included.

As to the alkenyl group, for example, a vinyl group and an allyl group are included. The vinyl group is particularly preferable among them.

The compound expressed by the formula (1) has a high refractive index attributed to a naphthalene skeleton and a polymerization reactivity attributed to the vinyl group. Therefore, a polymer of the compound expressed by the above formula (1) may become a solid particle having a high refractive index.

In addition, the compound (monomer) expressed by the formula (1), for example, 1-vinyl naphtalen, 2-vinyl naphthalene, etc. are included. Further, an arbitrary hydrogen atom bonded to the naphthalene ring may be substituted by the alkyl group of carbon number 1 to 12 or the halogen atom on the purpose of controlling the refractive index or the deposition rate at the polymerization reaction.

The compound expressed by the above formula (1), as a refractive index control agent, can be mixed with, for example, either known polymer fine particles or pigment particles so as to increase the refractive index of the fine particles.

Here, that the polymer of the compound expressed by the above formula (1) is included can be detected, for example, by a chemical shift of the naphthalene site in a nuclear magnetic resonance spectrum.

As to the compound expressed by the formula (1), either the compound expressed by the following formula (3) or (4) is preferred.

Structural Formula (3)

Structural Formula (4)

In the formulas (3) and (4), the naphthalene ring may be substituted by at least one of an alkyl group having carbon number of 1 to 12 and a halogen atom.

A number average particle diameter of the fine particles is preferably 50 nm to 10 μm and is more preferably 200 nm and 1 μm. When the number average particle diameter is less than 50 nm, there is a case that light scattering power is lowered and color may change from white to transparent. When the particle diameter is more than 10 μm, the electrophoretic speed or the dispersion stability in the dispersion solvent may be lowered.

Further, the fine particles preferably include a macromer. This macromer is a high-molecular compound having reactivity and can form a copolymer by copolymerizing with the compound expressed by the above formula (1).

In the above macromer, a polymer of a radical polymerization macromer of a one-end reactive type has a comb-like structure in which many side chains are bonded to a main chain. In providing a property compatible to a solvent with the comb-like structure portion, a copolymer with the compound expressed by the formula (1) and the macromer has an advantage of increasing a dispersion stability to the solvent given a great steric effect, in addition to a property obtained from the compound expressed by the formula (1).

As to such macromers, a one-end methacryloil group modified methyl polymetacrylate, a one-end methacryloil group modified ethyl polymetacrylate, a one-end methacryloil group modified butyl polymetacrylate, a one-end methacryloil group modified octyle polymetacrylate, a one-end methacrylroil group modified dodecyl polymetacrylate, etc. are exemplified.

As to the above macromer, a silicone macromar expressed by the following formula (2) is preferably used.

Structural Formula (2)

In the above formula (2), $R_1$ represents a hydrogen atom or a methyl group. $R_1'$ represents a hydrogen atom or an alkyl group. The alkyl group preferably has a carbon number of 1 to 4, for example, a methyl group, an ethyl group, a propyl group, etc.

"n" represents a natural number and, for example, 2 to 200 is preferable and 5 to 100 is more preferable. "x" represents an integer of 1 to 3.

A mass-average molecular mass of the silicone macromer expressed by the formula (2) is not particularly limited and it may be appropriately selected depending on purposes. But it is preferable 500 to 50,000. For example, when x=3, products having a mass-average molecular mass of 1,000, 5,000 and 10,000 have been actually on the market. Any of them can be used well.

A polysiloxane site of the above silicone macromer has excellent affinity with the non-polar organic solvent, particularly with an aliphatic hydrocarbon or a silicone oil to a dispersion medium which is used preferably in the electrophoresis image display medium. Thus, the fine particles having excellent dispersion stability to the dispersion medium can be obtained.

A content of the macromer in the fine particles is not limited and may be selected appropriately upon purposes. However, it is preferable to have 1 part by mass to 20 parts by mass to 100 parts by mass of the compound expressed by the above formula (1).

The fine particles may contain other reactive monomers, upon necessity, other than the compound expressed by the formula (1) and the macromer.

The reactive monomers are not limited and may be selected appropriately upon purposes. Such examples include 2-ethylhexane(meta)acrylate, octyl(meta)acrylate, nonyl(meta)acrylate, decyl(meta)acrylate, lauryl(meta)acrylate, stearyl (meta)acrylate, vinyllaurate, laurylmetacryleamide, stearylmetacrylamide, methoxyethyl(meta)acrylate, etoxyethyl(meta)acrylate, butoxyethyl(meta)acrylate, methyl (meta)acrylate, ethyl(meta)acrylate, buthyl(meta)acrylate, hexyl(meta)acrylate, cyclohexyl(meta)acrylate, benzyl (meta)acrylate, phenyl(meta)acrylate, styrene, vinyltoluene, vinylacetate, ethylene glycoldi(meta)acrylate, divinylbenzen, etc. They may be used alone or in combination.

An amount of the reactive monomer to add is not limited if it is not lower the refractive index of the generated fine particles. It is preferable, generally, 50% by mass or lower to the whole mass content of the fine particles.

(Method of Producing Fine Particles)

A method of producing fine particles of the present invention includes forming fine particles by polymerizing a compound expressed by either the following formulas (3) and (4) and further includes other processes as needed.

Structural Formula (3)

Structural Formula (4)

In the above formulas (3) and (4), the naphthalene ring may be substituted by at least one of an alkyl group having carbon number of 1 to 12 and a halogen atom.

Since the compound expressed by the above formula has a high refractive index attributed to a naphthalene skeleton, the fine particles obtained by including the monomer in producing fine particles are to have a high light-scattering strength.

The above polymerization is a so-called dispersion polymerization method that any one of the compound expressed by the above formula (3) or the formula (4) is in a soluble solvent and particles which are insoluble to a polymer are made to deposit in the solvent. By controlling dispersibility to a solvent in the deposition stage, the fine particles obtained by this method are that a particle diameter is comparatively uniform and dispersion stability is excellent. Examples of means for controlling dispersibility include that addition of a dispersing agent preferably used in a known dispersion polymerization and copolymerization with a macromer describing later.

The content of the compound (monomer) expressed in the formula (1) in the solvent, depending on usages and optical properties of the fine particles, is preferably between 10% by mass to 100% by mass, and is more preferably 15% by mass to 60% by mass.

Preferably, the solvent is a non-polar organic solvent. Such non-polar organic solvents are, for example, paraffinic hydrocarbon such as pentane, hexane, heptane, octane, nonane, decane, dodecane; isoparaffinic hydrocarbon such as isohexane, isooctane, isododecane; alkylnaphthen hydrocarbon such as liquid paraffin; aromatic hydrocarbon such as benzene, toluene, xylene, alkylbenzen, solvent naphtha; silicone oil such as dimethylsilicone oil, phenylmethylsilicone oil, dialkylsilicone oil, alkylphenylsilicone oil, cyclic polydialkylsiloxane, or cyclic polyalkylphenylsiloxane. Among them, the isoparaffinic hydrocarbons and silicone oils are more preferable.

In a method of producing the fine particles of the present invention, it is preferable to add a macromer as needed. The macromer is a macromolecule having reactivity. Particularly, a polymer of a radical polymerization macromer of a one-end reactive type has a comb-like structure in which many side chains are bonded against a main chain. In providing a property compatible to a solvent with the comb-like structure portion, a copolymer with the compound expressed by the formula (1) and the macromer has an advantage of increasing a dispersion stability to the solvent, in addition to the property obtained from the compound expressed by the formula (1) and thus given a great steric effect.

The macromer is preferably a silicone macromer expressed by the above formula (2). The polyxyloxane site of the silicone macromer has excellent affinity with a non-polar organic solvent, particularly with an aliphatic hydrocarbon or a silicone oil to a dispersion medium which is used preferably in the electrophoresis image display medium. Thus, the fine particles having dispersion stability and charging ability to the dispersion medium can be obtained.

(Fine Particle Dispersion Liquid)

A fine particle dispersion liquid of the present invention comprises by dispersing the fine particles of the present invention in a non-polar organic solvent and containing a dispersing agent, a charge control agent and other components as needed.

The non-polar organic solvent can be the same as the non-polar organic solvent used in the method of producing the fine particles.

In the fine particle dispersion liquid, the dispersing agent for controlling the dispersion ability of the fine particles is preferably added as needed. Examples of the dispersing agent include one that is soluble in a non-polar organic solvent and a polymer dispersing agent among known surfactants used as a particle dispersing agent.

Such fine particle dispersion liquid is preferably added a charge control agent for the purpose of improving electrophoretic performance. Examples of the charge control agent include metal dialkylsulfosuccinate such as cobalt dialkylsulfosuccinate, manganese dialkylsulfosuccinate, zirconium dialkylsulfosuccinate, yttrium dialkylsulfosuccinate, and nickel dialkylsulfosuccinate; metallic soap such as manganese naphthenate, calcium naphthenate, zirconia naphthenate, cobalt naphthenate, iron naphthenate, lead naphthenate, nickel naphthenate, chrome naphthenate, zinc naphthenate, magnesium naphthenate, manganese octanoate, calcium octanoate, zirconium octanoate, iron octanoate, lead octanoate, cobalt octanoate, chrome octanoate, zinc octanoate, magnesium octanoate, manganese dodecanoate, calcium dodecanoate, zirconium dodecanoate, iron dodecanoate, lead dodecanoate, cobalt dodecanoate, chrome dodecanoate, zinc dodecanoate, and magnesium dodecanoate; metal alkylbenzensulfonate such as calcium dodecylbenzensulfonate, sodium dodecylbenzensulfonate and barium dodecylbenzensulfonate; phospholipids such as lecitin and cehalin; organic amine group such as n-decylamin, etc. They may used alone or in combination of two or more.

The content of the charge control agent to the fine particle dispersion liquid is not particularly limited and may be selected appropriately depending on purposes. But it is preferable 0.001% by mass to 1% by mass.

The non-polar organic solvent can not be prescribed because it is different depending on the fine particles to be used, but it may be colorless and transparent, and further may be colored in a different color from the fine particles by dissolving a dye. For example, (1) that the non-polar organic solvent is colored in a different color than the fine particles dissolved a dye is preferable in increasing a display contrast. (2) it is preferable that the fine particles with two or more different types in color and charging ability are dispersed in the non-polar organic solvent.

Examples of the dye include azo dye, anthraquinone dye, hthalocyanine dye, and triallylmetan dye. Such dyes are, for example, Spirit black (SB, SSBB, SB), Nigrosine base (SA, SAP, SAPL, EE, EEL, EX, EXBP, EB), Oil yellow (105, 107, 129, 3G, GGS), Oil orange (201, PS, PR), Fast orange, Oil red (5B, RR, OG), Oil scarlet, Oil pink 312, Oil violet #730, Macrolex Blue RR, Sumiplast Green G, Oil brown (GR, 416), Sudan black X60, Oil green (502, BG), Oil blue (613, 2N, BOS), Oil black (HBB, 860, BS), Varifast yellow (1101, 1105, 3108, 4120), Varifast orange (3209, 3210), Varifast red (1306, 1355, 2303, 3304, 3306, 3320), Varifast pink 2310N, Varifast brown (2402, 3405), Valifast blue (3405, 1501, 1603, 1605, 1607, 2606, 2610), Varifast violet (1701, 1702), Varifast black (1802, 1807, 3804, 3810, 3820, 3830).

Each component described above is added to the non-polar organic solvent and then mixed and dispersed so as to obtain a particle dispersion liquid. In this case, known dispersing means such as a homogenizer, a ball mill, a sand mill, and an atritor are used as a dispersing means.

A solid mass proportion of the fine particles in the fine particle dispersion liquid is set appropriately to obtain a desired color intensity but it is preferable 0.1% by mass to 25% by mass.

(Image Display Medium)

The image display medium of the present invention includes a pair of electrode substrates and at least the fine particle dispersion liquid of the present invention between the pair of the electrode substrates. Image is displayed by applying voltage between the pair of the electrode substrates to cause electrophoresis of the fine particles.

In this case, at least one of the pair of the electrode substrates is preferably light-transmissive.

According to the image display medium of the present invention, the dispersion medium may be separated into microspaces by means of a partition or a microcapsule between the pair of the substrates in order to prevent from aggregation or deviation of the particles in the dispersion medium. In any means, it is preferable that between the two electrodes are divided by a plurality of micro-cells so that the deviation of the particles due to gravity and the aggregation of the particles themselves can be prevented.

A producing method of such microcapsule is not particularly limited and it is selected appropriately on purposes. For example, known methods such as a coacervation method and a phase separation method can be used.

—Electrodes—

The above electrodes are not particularly limited and are selected appropriately on purposes. Usually, an electrode in which a conductive layer is formed on the substrate constituted by a glass or a plastic is exemplified.

Materials of the above plastic substrates are, for example, an acrylic resin, a polycarbonate resin and an epoxy resin.

Such conductive layer is not particularly limited and is selected upon purposes. However, transparent conductive layers are preferable. Metals such as Al, Ag, Ni, Cu, etc. and transparent conductive materials such as ITO, $SnO_2$, ZnO, etc. are formed in a membrane state by a spattering method, a vacuum evaporation method, a CVD method, a coating method, etc. or an conductive material is mixed with a solvent or a synthetic resin and coated.

Examples of such conductive materials include cationic polymer electrolytes such as polymethylbenzyltrimethyl chloride, polyallylpolymethylammonium chloride; anionic polymer electrolytes such as polystyrenesulfonic acid salt and polyacrylic acid salt; and electronic conductors such as zinc oxide, tin oxide, and fine powder of indium oxide, etc.

The conductive layer may have a thickness in a degree to have self-supporting ability or the conductive layer is provided on the substrate which has a self-supporting ability. Any of these can be used.

The conductive layer may be a layer having an anisotropic conductivity, or a layer having a patterned or multi-dot segment in which a conductive portion is formed through a thickness direction. In any case, when a power electrode is contacted to a part of the conductive layer, it is possible that an electric filed is generated between the conductive layers. Thereby, white or colored particles can be moved definitely. It is easy in displaying when a voltage applicator is prepared between the conductive layers.

—Other Materials—

Other materials not mentioned above include, for example, a metal reflecting plate, a light diffusing plate, a reflection preventing layer. They may be used alone or in combination of two or more kinds. Further, a TFT, etc. may be disposed on the electrodes (a lower substrate).

Figure 1:
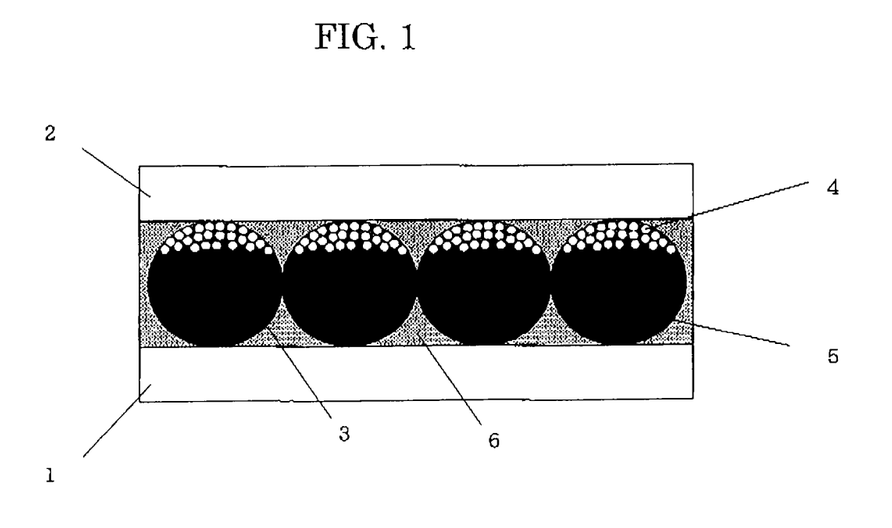
FIG. 1 is a sectional view illustrating one example of an image display medium according to the present invention.

An example of the image display medium of the present invention will be explained with reference to FIG. 1. Referring to FIGS. 1, 1 and 2 denote conductive layers and at least one of them is light-transmissive. 3 denotes a microcapsule. 4 denotes white particles, in which fine particles of the present invention are used. 5 denotes colored dispersion medium, in which a non-polar organic medium is colored different from a color of the white fine particles. In the colored dispersion medium, a dispersing agent for controlling dispersibility of the dispersing particle of the colored dispersion medium may be added as needed.

6 denotes an adhesion supporting layer, which holds the microcapsule 3 between the conductive layers 1 and 2. Preferably, it is transparent and is excellent in electric insulation ability. Particularly, hardening materials of solventless type are preferable. Such materials include, epoxy resin of the light hardening type, urethane resin, acrylic resin, etc.

When a power electrode is contacted to a part of the conductive layers 1 and 2, it is possible that an electric filed is generated between the conductive layers 1 and 2. Thereby, white particles can be moved definitely. The display is made easy when a voltage applicator is prepared between the conductive layers 1 and 2.

Figure 2:
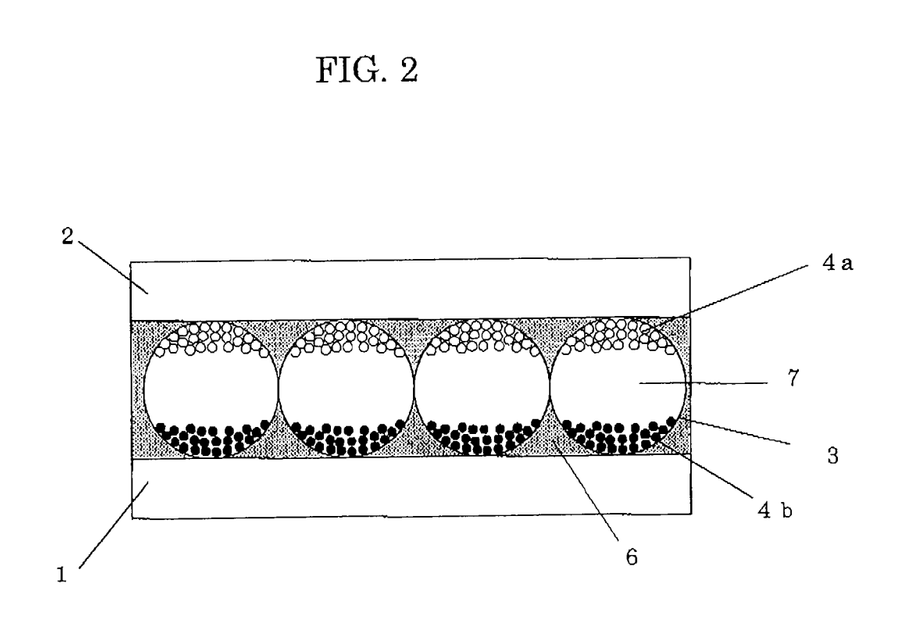
FIG. 2 is a sectional view illustrating another example of an image display medium according to the present invention.

FIG. 2 shows another example of the image display medium of the present invention. In FIGS. 2, 1 and 2 denote conductive layers and at least one of them is light-transmissive. The same materials mentioned above for the conductive layers can be used. 4a and 4b denote white or colored particles and they are different in color and charging polarity.

In FIG. 2, 7 is a non-polar organic solvent and is preferably colorless and transparent. This is because that bad influence is not given to image contrast based on a color difference of the white or colored particles of 4a and 4b. In the non-polar organic solvent 7, a dispersing agent for controlling dispersibility of the dispersing particle is preferably added as needed. For the white particles constituting the fine particle dispersion liquid, the fine particles of the present invention are used. For the colored particles, known electrophoretic particles having other than white color are used.

When a power electrode is contacted to a part of the conductive layers 1 and 2, it is possible that an electric filed is generated between the conductive layers 1 and 2. Thereby, two types of particles 4a and 4b can move definitely in reverse direction, respectively. The display is made easily when a voltage applicator is prepared between the conductive layers 1 and 2.

The image display medium of the present invention is produced, for example, by coating a compound mixed the microcapsule containing the fine particle dispersion liquid obtained the above-mentioned and an adhesive to be the adhesion supporting layer, and adhering the opposing electrode substrates.

The coating method is not particularly limited but is selected appropriately depending on purposes. Known coating film methods such as blade, wire bar, dipping and spin coating can be used, and the image display medium can be produced easily.

In the image display medium of the present invention, since the particle dispersion liquid is used in which the fine particles with high white reflectance and excellent dispersion stability were dispersed, the image display medium with excellent display memorability can be provided.

(Image Display Apparatus)

The image display apparatus of the present invention comprises display means for displaying the image display medium of the present invention, and further comprises a driving circuit, an operation circuit, an inside memory, a power source, and other means as needed.

The image display apparatus of the present invention includes the particle dispersion liquid of the present invention which is high white reflectance and is excellent in dispersion stability and charging, thereby the image display apparatus with excellent display memorability can be provided.

Figure 3:
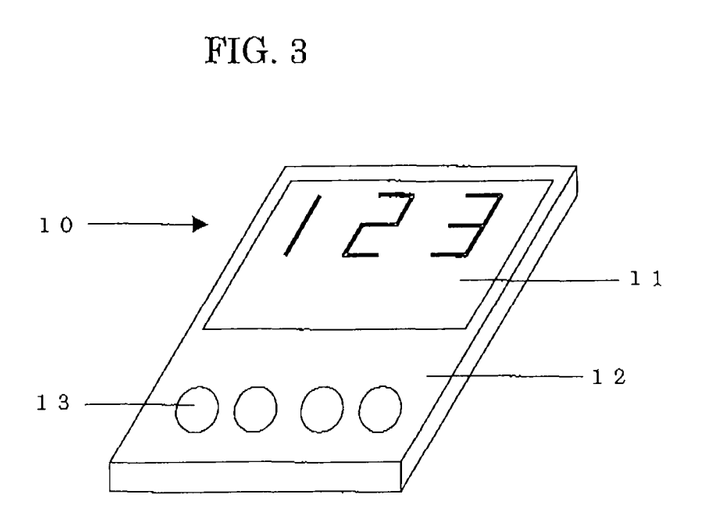
FIG. 3 is a schematic view illustrating one example of an image display apparatus according to the present invention.

FIG. 3 is a schematic view illustrating one example of an image display apparatus according to the present invention. As shown in FIG. 3, the image apparatus 10 comprises an image display medium 11, a case 12, information inputting means 13, a driving circuit (not shown), an operation circuit (not shown), an inside memory (not shown) and a power source (not shown). The electrode in the image display medium 11 in FIG. 3 forms dot-matrix. Image can be displayed as a whole by designating the dot to display ON.

Hereinafter, examples of the present invention will be described but the present invention is not intended to be limited in these examples.

EXAMPLE 1

Production of Fine Particles

In a reaction vessel equipped with a stirrer, a thermometer and a reflux condenser, 100 parts by mass of isoparaffinic hydrocarbon (Isopar G, manufactured by Exxon Chemical Inc.), 10 parts by mass of 2-vinylnaphthalene (manufactured by Shin Nippon Steel Chemical Co, Ltd.), 1 mass part of silicone macromer (Silaplain FM 0721, manufacture by Chisso Co.) and 0.1 mass part of azobisisobutyronitrile (manufactured by Wako Junyaku Co.) were added while stirring at 200 rpm and heated at 70° C. The mixture was stirred for 24 hours at this temperature to complete the reaction. White fine particles comprising a copolymer of 2-vinylnaphthalene and silicone macromer with a number average particle diameter of 1 μm were obtained.

—Production and Operation of the Image Display Medium—

10 parts by mass of urea, 1 part of resorcinol and 10 parts by mass of ethylene-maleic anihydride polymer were dissolved in 290 parts by mass of water to adjust a p.H at 3.5 by a sodium hydrate aqueous solution.

Separately, in 30 parts by mass of saturated solution of dye (Macrolex Blue RR, manufactured by Bayer Corp.) in the isoparaffinic hydrocarbon (Isopar H, manufactured by Exxon Chemical Inc.), 6 parts by mass of the above white fine particles and 0.03 parts by mass of zirconium dioxide octoate as a charge control agent were added to prepare a fine particle dispersion liquid by ultrasonic dispersion.

Next, the obtained fine particle dispersion liquid was added to the above aqueous solution, and further 25 parts by mass of formaldehyde solution was added while stirring and heating at 50° C. for 3 hours. After complete the reaction, a microcapsule was collected by suction-filtration, washing and drying.

The obtained microcapsule was dispersed in an ultraviolet curing epoxy resin (Product Name: 3121, manufactured by Three Bond Co.) and was coated with a wire bar on a glass substrate with ITO electrodes. Next, the coating film was inserted with another ITO electrode to make the electrodes therebetween 100 μm and was cured after exposed an ultraviolet. The image display medium was produced by the above steps.

<Performance Test>

In the obtained image display medium, when −100 V was applied to the upper ITO electrode, the white fine particles were quickly deposited on the upper electrode and were seen as a white color from the upper substrate surface. Next, +100 V was applied to the upper ITO electrode, the white fine particles were moved to the lower electrode and a colored state attributed to a color of dye was clearly seen from the upper substrate surface. Further, white reflection when a white color is displayed (a proportion of an amount of white incident light to an amount of reflected light) is 35%. This white color state was left without applying voltage for 1 day, almost no changes was seen to the white reflection.

COMPARATIVE EXAMPLE 1

Preparation and Operation of the Image Display Medium

The image display medium was produced by the same manner as in Example 1 except that titanium oxide was used as white electrophoretic particles.

<Performance Test>

In the obtained image display medium, when switching the display by applying voltage, an initial white reflectance at the white displaying was 38%, but the white reflectance was lowered to 20% after left for 1 day.

EXAMPLE 2

Production of Fine Particles

The fine particles were synthesized by the same manner as in Example 1, except that 100 parts of silicone oil (KF96L-1cs, manufactured by Shinetsu Kagaku K. K.) instead of 100 parts by mass of isoparaffinic hydrocarbon (Isopar G, manufactured by Exxon Chemical Inc.) was used as a reaction solvent. The same white fine particles as in Example 1 were obtained.

Further, 10 parts by mass of carbon black (MA 100, manufactured by Mitsubishi Chemical Co.) as black color particles and 90 parts by mass of polyethylene were prepared to melt-kneading and pulverizing by heat.

—Production and Operation of the Image Display Medium—

The image display medium was produced by the same manner as in Example 1, except that the particle dispersion liquid was prepared by 6 parts by mass of the above obtained white fine particles and 1 mass part of black particle were added to 30 parts by mass of silicone oil by ultrasonic dispersion.

<Performance Test>

In the obtained image display medium, when −100 V was applied to the upper ITO electrode, the white fine particles were quickly deposited on the upper electrode. On the other hand, the black particles were moved to the lower electrode and were seen as a white color from the upper substrate surface. Next, +100 V is applied to the upper ITO electrode, the white fine particles were moved to the lower electrode. On the other hand, the black particles were moved to the upper electrode and were seen as a black color as from the upper substrate. Further, white reflection when a white color is displayed was 40%. This white color state was left without applying voltage for 1 day, almost no changes was seen to the white reflection.

COMPARATIVE EXAMPLE 2

Preparation and Operation of the Image Display Medium

The image display medium was produced by the same manner as in Example 2, except that titanium oxide was used as white electrophoretic particles.

<Performance Test>

In the obtained image display medium, when switching the display by applying voltage, an initial white reflectance at the white displaying was 42%, but the white reflectance was lowered to 25% after left for 1 day.

EXAMPLE 3

In a reaction vessel equipped with a stirrer, a thermometer and a reflux condenser, 10 parts by mass of 2-vinylnaphthalene (manufactured by Shin Nippon Steel Chemical Co, Ltd.), 10 parts by mass of styrene (manufactured by Tokyo Kasei Co.), 10 parts by mass of silicone macromer (Silaplain FM 0721, manufacture by Chisso Co.) and 0.1 mass part of lauroyl peroxide (manufactured by Wako Junyaku Co.) were dissolved in 100 parts by mass of silicone oil (KF96L-1cs, manufactured by Shinetsu Kagaku Kogyo, Co.) while stirring at 200 rpm and heated at 70° C. The mixture was stirred for 24 hours at this temperature to complete the reaction. White fine particle with an number average particle diameter of 700 nm were obtained.

—Production and Operation of the Image Display Medium—

The image display medium was produced as the same manner in Example 1 using the obtained white particles.

<Performance Test>

In the obtained image display medium, when −100 V was applied to the upper ITO electrode, the white fine particles were quickly deposited on the upper electrode and were seen as a white color from the upper substrate surface. Next, +100 V was applied to the upper ITO electrode, the white fine particles were moved to the lower electrode and a colored state attributed to a color of dye was clearly seen from the upper substrate surface. Further, white reflection when a white color is displayed (a proportion of an amount of white incident light to an amount of reflected light) was 35%. When this white color state was left without applying voltage for 1 day, almost no change was seen to the white reflection.

The invention claimed is:

1. Fine particles consisting of a polymer, wherein the polymer consists of units obtained from:
    a macromer;
    a compound expressed by the following formula (1), Structural Formula (1)

wherein in the formula (1), R represents a hydrogen atom, a halogen atom, an alkyl group or an alkenyl group, "m"

represents an integer of 1 to 10, and at least one of R represents the alkenyl group; and optionally, one or more reactive monomers selected from the group consisting of 2-ethylhexane (meth)acrylate, octyl (meth)acrylate, nonyl (meth)acrylate, decyl (meth) acrylate, lauryl (meth)acrylate, stearyl (meth)acrylate, vinyl laurate, lauryl methacrylamide, stearyl methacrylamide, methoxyethyl(meth)acrylate, ethoxyethyl (meth)acrylate, butoxyethyl(meth)acrylate, methyl (methacrylate, ethyl(meth)acrylate, butyl(meth)acrylate, hexyl(meth)acrylatecyclohexyl(meth) acrylate, benzyl(meth)acrylate, phenyl(meth)acrylate, syrene, vinyltoluene, vinyl acetate, ethyleneglycol di(meth)acrylate, and divinylbenzene.

2. The fine particles according to claim 1, wherein the macromer is a silicone macromer expressed by the following formula (2),

Structural Formula (2)

wherein in the formula (2), $R_1$ represents a hydrogen atom or a methyl group, $R_1'$ represents a hydrogen atom or an alkyl group having carbon number of 1 to 4, "n" represents a natural number and "x" represents an integer of 1 to 3.

3. A method of producing fine particles comprising: forming fine particles as claimed in claim 1 by polymerizing a compound expressed by any one of the following formulas (3) and (4) and adding a macromer; and optionally one or more reactive monomers selected from the group consisting of 2-ethylhexane (meth)acrylate, octyl (meth)acrylate, nonyl (meth)acrylate, decyl (meth)acrylate, lauryl (meth)acrylate, stearyl (meth)acrylate, vinyl laurate, lauryl methacrylamide, stearyl methacrylamide, methoxyethyl(meth)acrylate, ethoxyethyl(meth)acrylate, butoxyethyl(meth)acrylate, methyl(methacrylate, ethyl(meth)acrylate, butyl(meth)acrylate, hexyl(meth)acrylatecyclohexyl(meth)acrylate, benzyl (meth)acrylate, phenyl(meth)acrylate, syrene, vinyltoluene, vinyl acetate, ethyleneglycol di(meth)acrylate, and divinylbenzene, Structural Formula (3)

Structural Formula (4)

wherein in the above formulas (3) and (4), a naphthalene ring may be substituted by at least one of an alkyl group having carbon number of 1 to 4 and a halogen atom.

4. The method of producing fine particles according to claim 3, wherein the macromer is a silicone macromer expressed by the following formula (2), Structural Formula (2)

wherein $R_1$ represents a hydrogen atom or a methyl group, $R_1'$ represents a hydrogen atom or an alkyl group having carbon number of 1 to 4, "n" represents a natural number and "x" represents an integer of 1 to 3.

* * * * *